US009436857B2

(12) United States Patent
Wang et al.

(10) Patent No.: US 9,436,857 B2
(45) Date of Patent: Sep. 6, 2016

(54) ENCODED INFORMATION READING SYSTEM INCLUDING RFID READING DEVICE HAVING MULTIPLE ANTENNAS

(75) Inventors: Ynjiun Paul Wang, Cupertino, CA (US); Huyu Qu, San Jose, CA (US)

(73) Assignee: HAND HELD PRODUCTS, INC., Fort Mill, SC (US)

( * ) Notice: Subject to any disclaimer, the term of this patent is extended or adjusted under 35 U.S.C. 154(b) by 240 days.

(21) Appl. No.: 13/350,940

(22) Filed: Jan. 16, 2012

(65) Prior Publication Data

US 2013/0181815 A1 Jul. 18, 2013

(51) Int. Cl.
*G06K 7/01* (2006.01)
*G06K 7/10* (2006.01)

(52) U.S. Cl.
CPC .................. *G06K 7/10356* (2013.01)

(58) Field of Classification Search
CPC .................................. G06K 7/10356
USPC ............. 340/10.1, 572.1, 572.7, 10.4, 539.1, 340/534; 343/867; 235/383; 370/345
See application file for complete search history.

(56) References Cited

U.S. PATENT DOCUMENTS

| | | | |
|---|---|---|---|
| 3,946,385 A * | 3/1976 | Ewen ........................ | G01S 1/302 342/386 |
| 6,456,239 B1 | 9/2002 | Werb et al. | |
| 7,724,141 B2 * | 5/2010 | Reynolds ................... | 340/572.7 |
| 7,822,148 B2 * | 10/2010 | Shapira et al. ............... | 375/299 |
| 7,834,816 B2 * | 11/2010 | Marino et al. ................ | 343/867 |
| 7,848,386 B2 | 12/2010 | Rofougaran | |
| 7,932,830 B2 | 4/2011 | Campero et al. | |
| 8,035,523 B2 | 10/2011 | DeRose et al. | |
| 8,044,804 B1 | 10/2011 | McReynolds | |
| 8,064,495 B2 | 11/2011 | Rofougaran | |
| 8,294,533 B2 * | 10/2012 | Dupuy et al. ................. | 333/136 |
| 8,313,024 B2 * | 11/2012 | Marino ........................ | 235/383 |
| 8,350,701 B2 * | 1/2013 | Carrender et al. ......... | 340/572.7 |
| 8,384,544 B2 * | 2/2013 | Vrba et al. .................. | 340/572.1 |
| 8,416,031 B2 * | 4/2013 | Dupuy et al. ................. | 333/101 |
| 2004/0234012 A1 * | 11/2004 | Rooyen ........................ | 375/347 |
| 2005/0035849 A1 | 2/2005 | Yizhack | |
| 2005/0085197 A1 * | 4/2005 | Laroia ....................... | H01Q 3/24 455/101 |
| 2005/0152473 A1 * | 7/2005 | Maltsev et al. ............... | 375/299 |
| 2006/0261928 A1 * | 11/2006 | Solberg et al. .............. | 340/10.4 |
| 2007/0200707 A1 | 8/2007 | Sweeney, II | |
| 2008/0076476 A1 | 3/2008 | Rofougaran | |
| 2008/0198019 A1 * | 8/2008 | Rodgers ..................... | 340/572.7 |
| 2008/0266092 A1 | 10/2008 | Campero et al. | |

(Continued)

*Primary Examiner* — Fekadeselassie Girma
*Assistant Examiner* — Chico A Foxx
(74) *Attorney, Agent, or Firm* — Oliff PLC; R. Brian Drozd

(57) ABSTRACT

An encoded information reading (EIR) system can comprise a microprocessor, a memory, and at least one RFID reading device, all communicatively coupled to a system bus. The EIR system can further comprise two or more external antennas electrically coupled to a multiplexing circuit. The multiplexing circuit can be configured to electrically couple each antenna to the RFID reading device by using a time division method or a frequency division method. The external antennas can be disposed according to a spatial pattern configured to provide a spatially continuous RFID signal reception within a pre-defined area or volume. The antennas can be configured to receive RFID signals from a plurality of RFID tags attached to a plurality of items and disposed within a radio frequency range of the antennas. The EIR system can be configured to store in its memory a plurality of responses received from the plurality of RFID tags.

16 Claims, 7 Drawing Sheets

(56) References Cited

U.S. PATENT DOCUMENTS

| | | |
|---|---|---|
| 2009/0029873 A1 | 1/2009 | Khan et al. |
| 2009/0058744 A1* | 3/2009 | Marino .................. 343/742 |
| 2009/0212921 A1 | 8/2009 | Wild et al. |
| 2009/0219157 A1 | 9/2009 | Sweeney, II |
| 2010/0039228 A1 | 2/2010 | Sadr et al. |
| 2010/0177070 A1* | 7/2010 | Zhu et al. ................ 345/205 |
| 2011/0128205 A1 | 6/2011 | Rofougaran |
| 2011/0199211 A1 | 8/2011 | Campero et al. |
| 2012/0077447 A1* | 3/2012 | Rofougaran ............... 455/73 |
| 2013/0010842 A1* | 1/2013 | Alexopoulos et al. ...... 375/219 |
| 2013/0060725 A1* | 3/2013 | Sugano et al. .............. 706/46 |
| 2013/0114588 A1* | 5/2013 | Kyperountas et al. ...... 370/345 |

\* cited by examiner

US 9,436,857 B2

ENCODED INFORMATION READING SYSTEM INCLUDING RFID READING DEVICE HAVING MULTIPLE ANTENNAS

FIELD OF THE INVENTION

The invention is generally related to encoded information reading (EIR) systems and is specifically related to EIR systems including radio-frequency identifier (RFID) reading devices.

BACKGROUND OF THE INVENTION

RFID methods are widely used in a number of applications, including smart cards, item tracking in manufacturing and retail, etc. An RFID tag can be attached, e.g., to an inventory item. An EIR system can be equipped with an RFID reader to read the memory of an RFID tag attached to an inventory item.

SUMMARY OF THE INVENTION

There is provided an encoded information reading (EIR) system comprising a microprocessor, a memory, and at least one RFID reading device, all communicatively coupled to a system bus. The EIR system can further comprise two or more external antennas electrically coupled to a multiplexing circuit via coaxial cables. The multiplexing circuit can be configured to electrically couple each antenna to the RFID reading device by using a time division method or a frequency division method. The external antennas can be disposed according to a spatial pattern configured to provide a spatially continuous RFID signal reception within a pre-defined area or volume. The antennas can be configured to receive RFID signals from a plurality of RFID tags attached to a plurality of items and disposed within a radio frequency range of the antennas. The EIR system can be configured to store in its memory a plurality of responses received from the plurality of RFID tags.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale, emphasis instead generally being placed upon illustrating the principles of the invention. In the drawings, like numerals are used to indicate like parts throughout the various views.

DETAILED DESCRIPTION OF THE INVENTION

In one embodiment, there is provided an encoded information reading (EIR) system comprising at least one radio frequency identifier (RFID) reading device. The RFID reading device can be configured to read and/or modify a memory of an RFID tag containing an encoded message. The RFID reading device can be further configured to output decoded message data corresponding to the encoded message.

The EIR system can further comprise two or more antennas and a multiplexing circuit configured to electrically couple each antenna to the RFID reading device. In one embodiment, the multiplexing circuit can be configured to alternatively couple each antenna to the RFID reading device by implementing a time division technology, so that during a given time slot not more than one antenna of the plurality of antennas is coupled to the RFID reading device. In another embodiment, the multiplexing circuit can be configured to couple each antenna to the RFID reading device by implementing a frequency division technology, as described in details herein infra. Various embodiments of the EIR system can be used in a numerous applications, including but not limited to, item tracking in manufacturing and retail, real-time inventory control systems, etc.

Item tracking and/or inventory control can be implemented by placing an RFID tag on each inventory item. Two or more antennas can be disposed throughout a manufacturing, retail, storage or other facility. The combined reception area of the two or more antennas can be represented by a 2D area or a 3D volume, and can be designed to provide spatially continuous RFID signal reception within the facility. In one embodiment, two or more antennas can be installed on two or more shelves within a warehouse. In another embodiment, two or more antennas can be installed in a vending machine.

Two or more antennas can transmit and receive radio frequency (RF) signals to and from multiple RFID tags attached to inventory items. An RFID tag can store the tag identifier in its memory. An RFID tag attached to an inventory item can further store in the tag's memory a product code of the item, an EPC code of the item, and/or at least one alphanumeric string identifying the item.

The RFID reading device can be configured to output decoded message data containing, for example, identifiers of the items to which the RFID tags are attached. The EIR system can be configured to store in its memory and/or transmit to an external computer the item identifiers received from the plurality of RFID tags.

Figure 1:
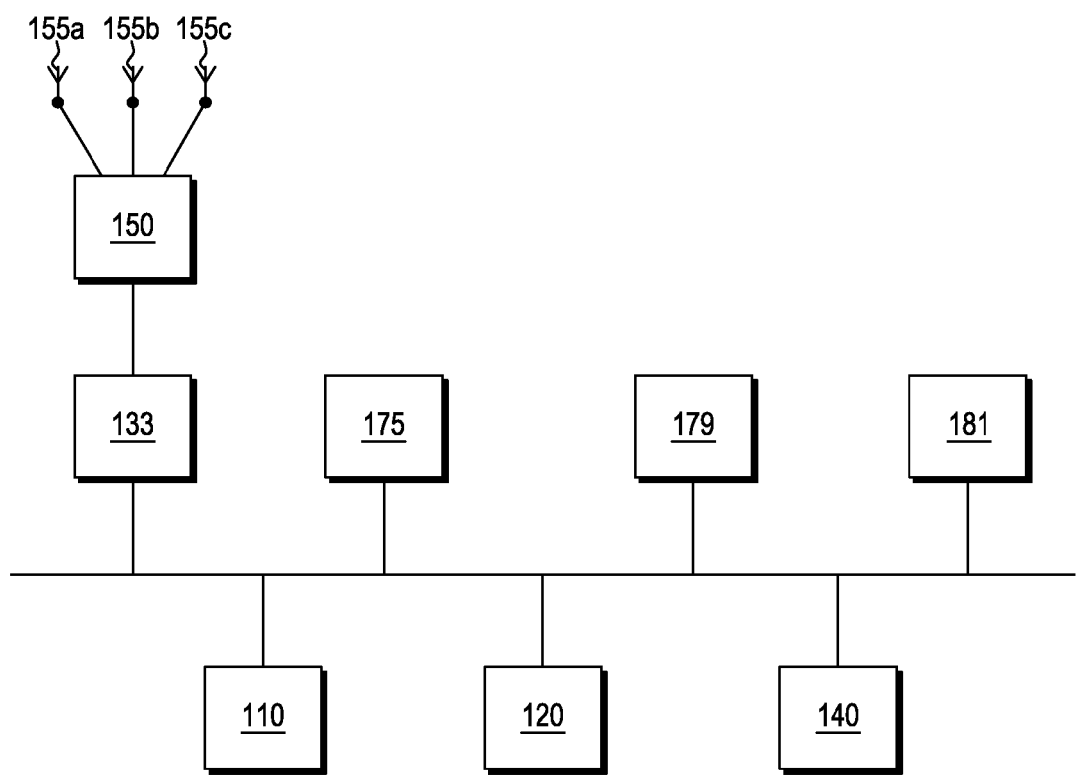
FIG. 1 schematically depicts a component-level diagram of one embodiment of the EIR system.

Component-level diagram of one embodiment of the EIR system is now being described with references to FIG. 1. EIR system 100 can comprise at least one microprocessor and a memory 120, both coupled to the system bus 170. The microprocessor can be provided by a general purpose microprocessor or by a specialized microprocessor (e.g., an ASIC). In one embodiment, the EIR system 100 can comprise a single microprocessor which can be referred to as a central processing unit (CPU). In another embodiment, the EIR system 100 can comprise two or more microprocessors, for example, a CPU providing some or most of the EIR system functionality and a specialized microprocessor performing some specific functionality. A skilled artisan would appreciate the fact that other schemes of processing tasks distribution among two or more microprocessors are within the scope of this disclosure.

The EIR system 100 can further comprise a communication interface 140 communicatively coupled to the system bus 170. In one embodiment, the communication interface can be provided by a wireless communication interface. The wireless communication interface can be configured to support, for example, but not limited to, the following protocols: at least one protocol of the IEEE 802.11/802.15/802.16 protocol family, at least one protocol of the HSPA/GSM/ GPRS/EDGE protocol family, TDMA protocol, UMTS protocol, LTE protocol, and/or at least one protocol of the CDMA/1×EV-DO protocol family.

The EIR system 100 can further comprise one at least one RFID reading device 133. In one embodiment, the RFID reading device 133 can be configured to read a memory of an RFID tag containing an encoded message and to output raw message data containing the encoded message. In another embodiment, the RFID reading device 133 can be configured to read a memory of an RFID tag containing an encoded message and to output decoded message data corresponding to the encoded message. As used herein, "message" is intended to denote a character string comprising alphanumeric and/or non-alphanumeric characters. An encoded message can be used to convey information, such as identification of the source and the model of a product, for example, in a UPC code.

The EIR system 100 can further comprise two or more external antennas 155a-155z. Each antenna can be electrically coupled via a coaxial cable to a multiplexing circuit 150. The multiplexing circuit 150 can be configured to couple each antenna to the RFID reading device 133.

Figure 2:
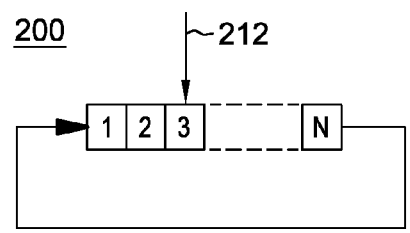
FIG. 2 schematically illustrates one embodiment of a switching algorithm that can be used by an antenna multiplexing circuit.

In one embodiment, the multiplexing circuit can be configured to alternatively couple each antenna to the RFID reading device by implementing a time division technology, so that during a given time slot not more than one antenna of the plurality of antennas is coupled to the RFID reading device. In a further aspect, the multiplexing circuit 150 can implement a round robin algorithm schematically shown in FIG. 2. The multiplexing circuit 150 can select an antenna pointed to by a counter 212 from a list 220, increment the counter 212, and return the counter to the beginning of the list 220 if the end of the list is reached. The selected antenna can be electrically coupled to the RFID reading device 133 for a pre-defined period of time, and then the next antenna can be selected from the list. In one embodiment, the multiplexing circuit 150 can be configured to switch to the next antenna 155a-155z responsive to establishing that the RF signal strength from the currently connected antenna is below a pre-defined threshold.

In another embodiment, the multiplexing circuit 150 can be configured to couple each antenna to the RFID reading device by implementing a frequency division technology. The distance between the antennas can exceed the effecting RF signal reception range by each antenna, and hence two or more antennas can transmit or receive two or more RF signals simultaneously. In order to distinguish the two or more RF signals within the RFID reading device, the signals received by each antenna can be frequency-shifted up or down by the multiplexing circuit 150 before feeding the signal into the RFID reading device, and signals to be transmitted by each antenna can be frequency-shifted up or down by the multiplexing circuit 150 before feeding the signals into the transmitting antenna, so that non-overlapping frequency ranges are assigned by the multiplexing circuit 150 to each antenna signals within the RFID reading device.

In a further aspect, the multiplexing circuit 150 can be implemented in hardware, software, or using both hardware and software components.

In one embodiment, the EIR system 100 can further comprise a software module for processing the data received from the plurality of RFID tags.

In one embodiment, the EIR system 100 can further comprise a display adapter 175 and a keyboard 179 allowing an operator of the EIR system 100 to select and visualize the data received from the plurality of RFID tags.

In one embodiment, the EIR system 100 can further comprise a power supply 181 provided, e.g., by an AC converter and/or by a battery. The components of the EIR system 100 can be incorporated into a variety of different housings including a portable housing and a housing which can be mounted on a fixed structure within a retail, manufacturing or storage facility.

Figure 3:
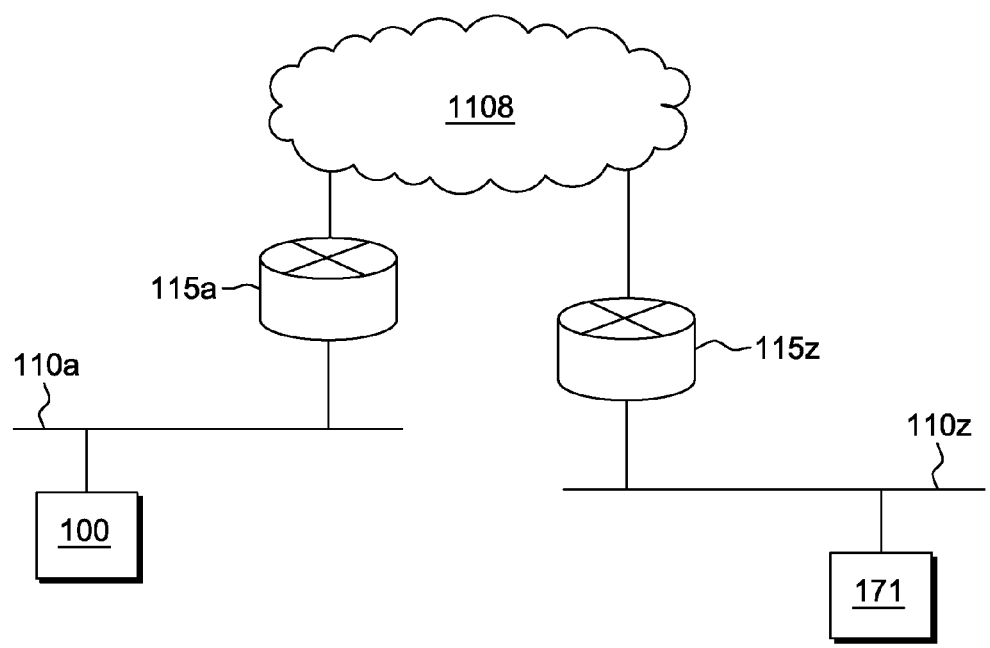
FIG. 3 schematically depicts one embodiment of a data collection system comprising the EIR system.

In one embodiment, the EIR system 100 can be configured to communicate to an external computer 171 as schematically shown in FIG. 3. The EIR system 100 can be communicatively coupled via the communication interface 140 to the network 110a which, in turn, can be communicatively coupled to one or more interconnected networks 110b-110z. The external computer 171 can be communicatively coupled to the network 110c. The EIR system 100 can establish a communication session with the external computer 171. In one embodiment, network frames can be exchanged by the EIR system 100 and the external computer 171 via one or more routers, base stations, and other infrastructure elements. In another embodiment, the external computer 171 can be reachable by the EIR system 100 via a local area network (LAN). In a yet another embodiment, the external computer 171 can be reachable by the EIR system 100c via a wide area network (WAN). A skilled artisan would appreciate the fact that other methods of providing interconnectivity between the EIR system 100 and the external computer 171 relying upon LANs, WANs, virtual private networks (VPNs), and/or other types of network are within the scope of this disclosure.

In one embodiment, the communications between the EIR system 100 and the external computer 171 can comprise a series of HTTP requests and responses transmitted over one or more TCP connections. A skilled artisan would appreciate the fact that using other transport and application level protocols is within the scope and the spirit of the invention.

In one embodiment, the external computer 171 can host an item tracking database. At least one of the messages transmitted by the EIR system 100 to the external computer 171 can include decoded message data corresponding to, e.g., an RFID label attached to an inventory item. For example, an EIR system 100 can transmit a request to the host computer to modify the item location record responsive to detecting a new item placed within the manufacturing, retail, or storage facility.

In a further aspect, the RFID reading device 133 can be compliant with EPC™ Class-1 Generation-2 UHF RFID Protocol for Communications at 860 MHz-960 MHz by EPCglobal, commonly known as the "Gen 2" standard, which defines physical and logical requirements for a passive-backscatter, Interrogator-talks-first (ITF) RFID system operating in the 860 MHz-960 MHz frequency range.

In one embodiment, the EIR system 100 can transmit information to a passive RFID tag by modulating an RF signal in the 860-960 MHz frequency range. An RFID tag can receive both information and operating energy from the RF signal transmitted by the EIR system 100. The EIR system 100 can receive information from the RFID tag by transmitting a continuous-wave (CW) RF signal to the RFID tag. "Continuous wave" can refer to any waveform transmitted by an RFID reading device and suitable to power a passive RFID tag, e.g., a sinusoid at a given frequency. The RFID tag can respond by modulating the reflection coefficient of its antenna, thus backscattering an information signal to the EIR system 100. In one embodiment, the RFID tag can modulate the reflection coefficient of its antenna only responsive to receiving an RFID signal from the EIR system 100.

In a further aspect, the EIR system 100 can be configured to send information to one or more RFID tags by modulating an RF carrier using double-sideband amplitude shift keying (DSB-ASK), single-sideband amplitude shift keying (DSB-ASK), or phase-reversal amplitude shift-keying (PR-ASK) using a pulse-interval encoding (PIE) format. RFID tags can receive their operating energy from the same modulated RF carrier.

In another aspect, the EIR system 100 can establish one or more sessions with one or more RFID tags. An RFID tag can support at least one session-dependent flag for every session. The session-dependent flag can have two states. An RFID tag can invert a session-dependent flag responsive to receiving a command from the EIR system 100. Tag resources other than session-dependent flags can be shared among sessions. In another aspect, an RFID tag can support a selected status flag indicating that the tag was selected by the EIR system 100.

Responsive to receiving an interrogation signal transmitted by the EIR system 100, an RFID tag can transmit a response signal back to the EIR system 100. The response signal can contain useful data, e.g., an Electronic Product Code (EPC) identifier, or a tag identifier (TID). The response signal can include a representation of a binary string, at least part of which is equal to at least part one of the specified one or more target item identifiers.

In one embodiment, the EIR system 100 can implement EPC™ Class-1 Generation-2 UHF RFID Protocol for Communications at 860 MHz-960 MHz by EPCglobal. The EIR system 100 can interrogate RFID tags using the commands described herein infra.

Select command can be used by the EIR system 100 to select a particular RFID tag population for the subsequent inventory round. Select command can be applied successively to select a particular tag population based on user-specified criteria. Select command can include the following parameters:

Target parameter indicates whether Select command modifies a tag's SL flag or Inventoried flag, and in the latter case it further specifies one of four available sessions (S0, . . . , S3);

Action parameter indicates whether matching tags assert or deassert SL flag, or set their Inventoried flag to A or B state; tags conforming to the contents of MemBank, Pointer, Length, and Mask parameters are considered to be matching;

Mask parameter contains a bit string that a tag should compare to a memory location specified by MemBank, Pointer, and Length parameters;

MemBank parameter specifies the memory bank to which Mask parameter refers (EPC, TID, or User);

Pointer parameter specifies a memory start location for Mask;

Length parameter specifies the number of bits of memory for Mask; if Length is equal to zero, all tags are considered matching.

Inventory command set can be used by the EIR system 100 to single out one or more individual tags from a group. A tag can maintain up to four simultaneous sessions and a binary Inventoried flag for each session. Inventory command set includes the following commands:

Query command can be used to initiate and specify an inventory round; it contains a slot counter value (Q=0 to 15) determining the number of slots in the round; the command also includes Sel parameter specifying which tags should respond to the Query.

QueryAdjust command can be used to adjust the value of the tag's slot counter Q without changing any other parameters;

QueryRep command can be used to repeat the last Query command;

Ack command can be used to acknowledge a tag's response;

NAK command can be used to force a tag to change its state to Arbitrate.

An RFID tag can implement a state machine. Once energized, a tag can change its current state to Ready. A selected tag can, responsive to receiving Query command, select a random integer from the range of $[0; 2^{Q-1}]$. If the value of zero is selected, the tag can transition to Reply state, backscattering a 16-bit random number. If a non-zero value is selected, the tag can load the selected random integer into its slot counter and change its state to Arbitrate.

Responsive to receiving the tag transmission, the EIR system 100 can acknowledge it with Ack command containing the same random number. Responsive to receiving Ack command, the tag can change its state to Acknowledged and backscatter its protocol control (PC) bits, EPC and cyclic redundancy check (CRC) value. Unacknowledged tag can select a new random integer from the range of $[0; 2^{Q-1}]$, load the value into its slot counter, and change its state to Arbitrate. Responsive to receiving QueryAdjust command, a tag in the Arbitrate state should decrement the value of its slot counter and backscatter its protocol control (PC) bits, EPC and CRC value if its slot counter is equal to zero.

Responsive to receiving the tag's transmission of its PC, EPC and 16-bit CRC value, the EIR system can send a QueryAdjust command causing the tag to invert its Inventoried flag and to transition to Ready state.

Access command set can be used by the EIR system 100 for communicating with (reading from and writing to) a tag. An individual tag must be uniquely identified prior to access. Access command set includes the following commands:

ReqRn command can be used by the EIR system 100 to request a handle from a tag; the handle can be used in the subsequent Access command set commands. Responsive to receiving Req_RN commands, a tag returns a 16-bit random integer (handle) and transitions from Acknowledged to Open or Secured state.

Read command can be used by the EIR system 100 to read tag's Reserved, EPC, TID and User memory;

Write command can be used by the EIR system 100 to write to tag's Reserved, EPC, TID and User memory;

Kill command can be used by the EIR system 100 to permanently disable a tag;

Lock command can be used by the EIR system 100 to lock passwords preventing subsequent read or write operations; lock individual memory banks preventing subsequent write operations; permanently lock the lock status of passwords or memory banks;

Access command can be used by the EIR system 100 to cause a tag having a non-zero access password to transition from Open to Secured state.

A skilled artisan would appreciate the fact that other methods of interrogating RFID tags by the EIR system 100 are within the scope of this disclosure.

In a further aspect, at least one antenna 155a-155z can be provided by a metamaterial (MTM) antenna. Metamaterials are artificial composite materials engineered to produce a desired electromagnetic behavior which surpasses that of natural materials. MTM-based objects can include structures which are much smaller than the wavelength of electromagnetic waves propagating through the material. MTM technology advantageously allows for precise control of the propagation of electromagnetic waves in the confines of small structures by determining the values of operating parameters which can include operating frequency, bandwidth, phase offsets, constant phase propagation, matching conditions, and number and positioning of ports.

In one aspect, an MTM antenna can be physically small as compared to other types of antennas: an MTM antenna can be sized, for example, on the order of one tenths of a signal's wavelength, while providing performance equal to or better than an antenna made of a conventional material and sized on the order of one half of the signal's wavelength. Thus, for a frequency range of 860 MHz-930 MHz, an MTM antenna can have a size of 33 mm or less.

The ability of an MTM antenna to produce a desired electromagnetic behavior can be explained by the fact that while most natural materials are right-handed (RH) materials (i.e. propagation of electromagnetic waves in natural materials follows the right-hand rule for the trio (E, H, β), where E is the electrical field, H is the magnetic field, and β is the phase velocity) exhibiting a positive refractive index, a metamaterial due to its artificial structure can exhibit a negative refractive index and follow the left-hand rule for the trio (E, H, β). A metamaterial exhibiting a negative refractive index can be a pure left-handed (LH) metamaterial by simultaneously having negative permittivity and permeability. A metamaterial can combine RH and LH features (Composite Right and Left Handed (CRLH) materials).

Figure 4A:
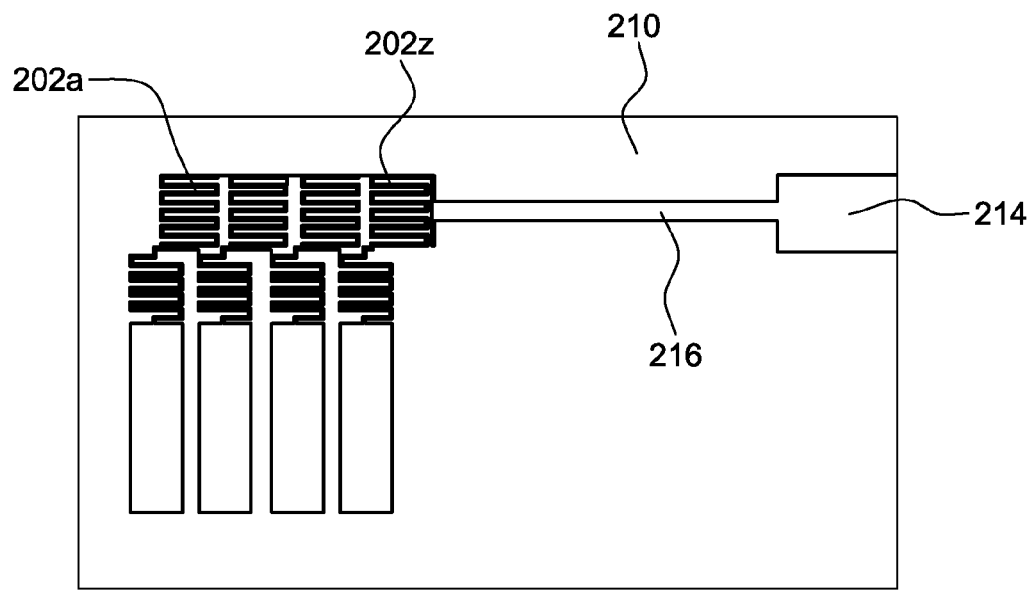
FIGS. 4-8 illustrate various embodiments of multiple cell metamaterial (MTM) antennas.
Figure 4B:
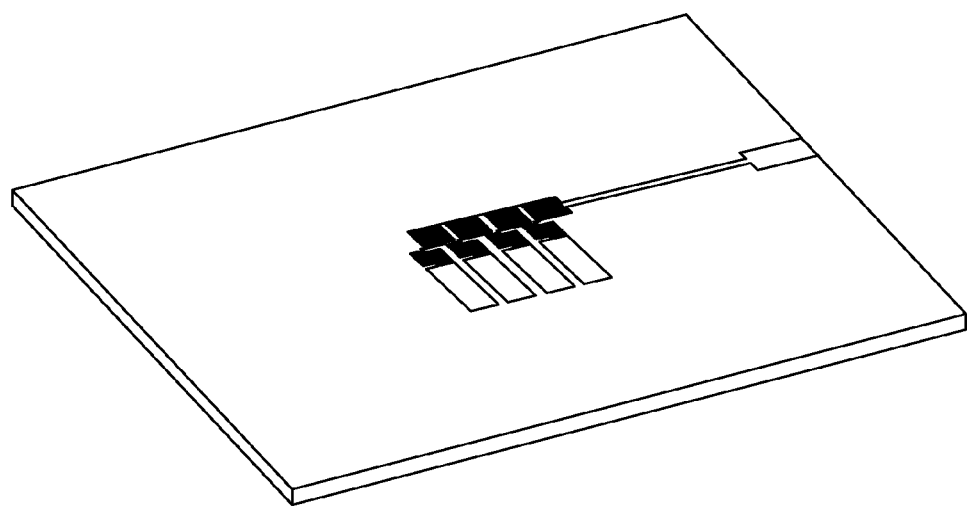

In one embodiment, antenna 155a-155z can be provided by a multiple cell MTM antenna shown in FIGS. 4a (top view) and 4b (3D view). Antenna 155a-155z can comprise one or more conductive cell patches 202a-202z that can be mounted on a dielectric substrate, provided, for example, by a printed circuit board (PCB) 210. Conductive cell patches 202a-202z can be spatially separated so that capacitive couplings between adjacent cell patches can be created. Also disposed on the dielectric substrate 210 can a feed pad 214 that can be provided, e.g., by a metallic plate and can be connected to a conductive feed line 216. Conductive feed line 216 can be provided, e.g., by metallic a strip. Conductive feed line 216 can be located close but separately from conductive cell patches 202a-202b. A skilled artisan would appreciate the fact that MTM antennas having two or more conductive feed lines are within the scope of this disclosure. A ground plane can be provided by a metallic layer disposed on the bottom side of PCB 210 (not shown in FIG. 4a). Each cell patch can be connected to the ground plane by a via.

Figure 5A:
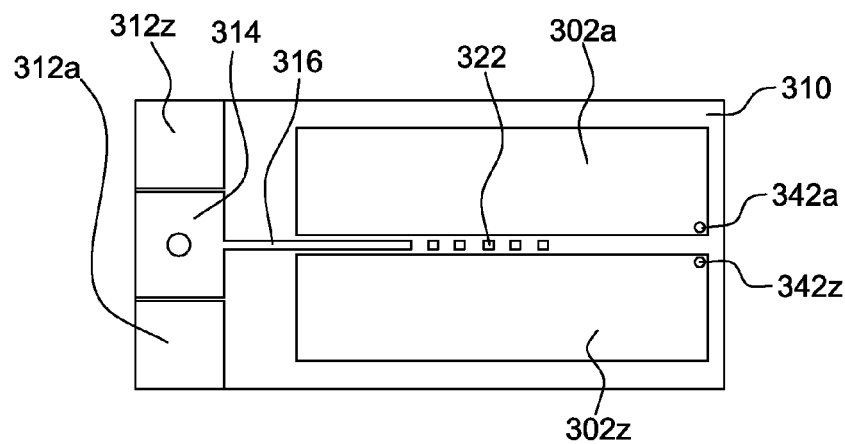
Figure 5B:
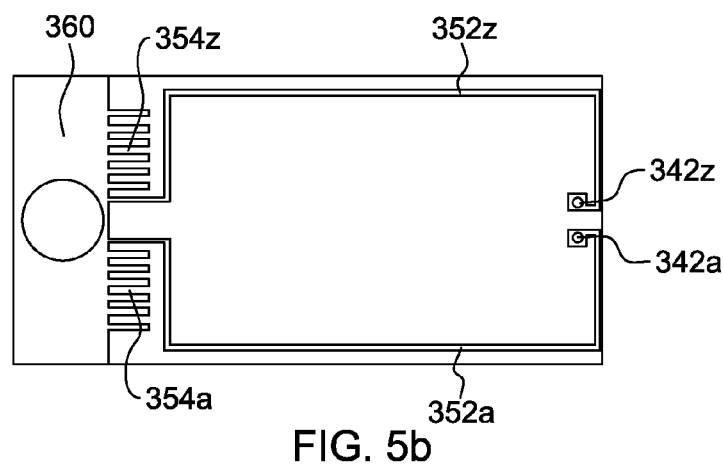

In one embodiment, antenna 155a-155z can be provided by a multiple cell MTM antenna shown in FIGS. 5a (top view), 5b (bottom view), and 5c (3D view). Antenna 155a-155z can comprise one or more conductive cell patches 302a-302z that can be mounted on a dielectric substrate, provided, for example, by a printed circuit board (PCB) 310. Conductive cell patches 302a-302z can be spatially separated so that capacitive couplings between adjacent cell patches can be created. Also disposed on the top surface of dielectric substrate 310 can be a feed pad 314 that can be provided, e.g., by a metallic plate and can be connected to a conductive feed line 316. Conductive feed line 316 can be provided, e.g., by a metallic strip, and can be located close but separately from conductive cell patches 302a-302z. A skilled artisan would appreciate the fact that MTM antennas having one or more conductive feed lines are within the scope of this disclosure. At least one conductive feed line can comprise a feed line tuner 322 provided by a conductive strip having a curved line form or an open polygon line form. A feed line tuner can be used to adjust resonant frequency of antenna 155a-155z as explained herein infra.

Figure 5C:
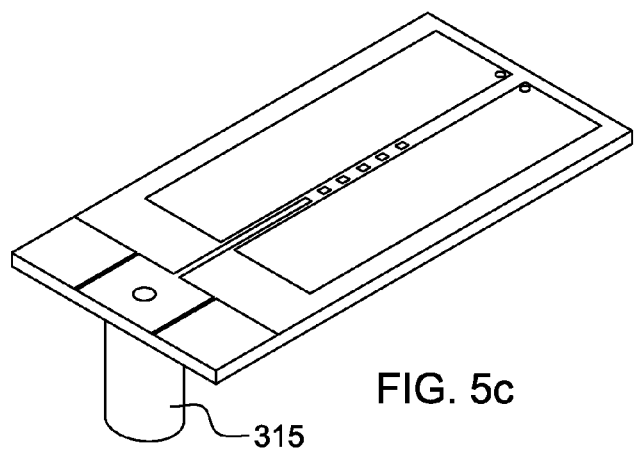

In one embodiment, feed pad 314 can be electrically coupled to coaxial cable connector 315. In one embodiment, shown in FIG. 5c, coaxial cable connector 315 can be connected from the bottom side of antenna 155a-155z. In another embodiment, coaxial cable connector 315 can be connected from a lateral side of antenna 155a-155z. In a yet another embodiment, feed pad 314 can be electrically coupled to a twisted cable.

Also disposed on the top surface of dielectric substrate 310 can be one or more ground planes 312a-312z provided, e.g., by one or more metallic plates.

One or more conductive cell patches 302a-302z can be connected by one or more vias 342a-342z to one or more conductive via lines 352a-352z disposed on the bottom surface of dielectric substrate 310. At least one conductive via line 352a-352z can comprise a via line tuner 354a-354z provided by a conductive strip having a curved line form or an open polygon line form. A via line tuner can be used to adjust resonant frequency of antenna 155a-155z as explained herein infra. Also disposed on the bottom surface of dielectric substrate 310 can be a bottom ground plane 360.

Figure 6A:
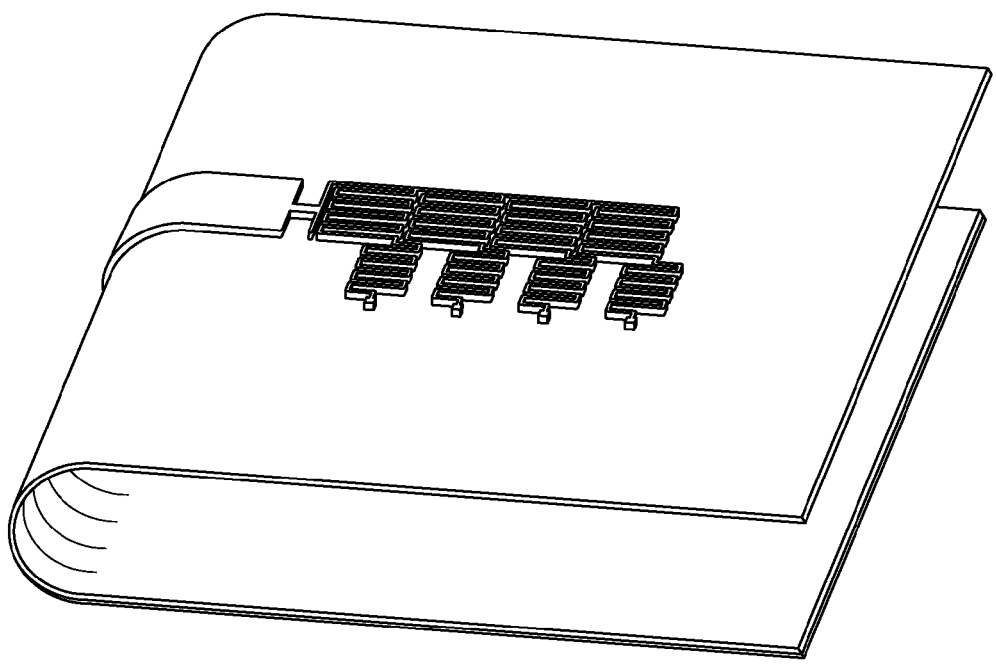
Figure 6B:
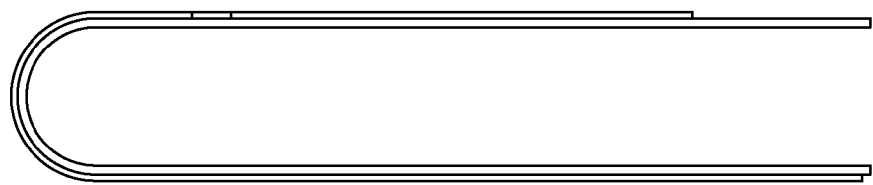

In one embodiment, dielectric substrate 310 can have a folded plane form-factor, as shown in FIGS. 6a (3D view) and 6b (side view). The gap between the two ends of the folded plane can be unfilled (air gap) or can be filled with a dielectric material. The folded design can advantageously offer extra air gap (or can be filled with other material). In another aspect, due to the folded design, a multi-layer MTM design can be implemented without inter-connections.

Figure 7A:
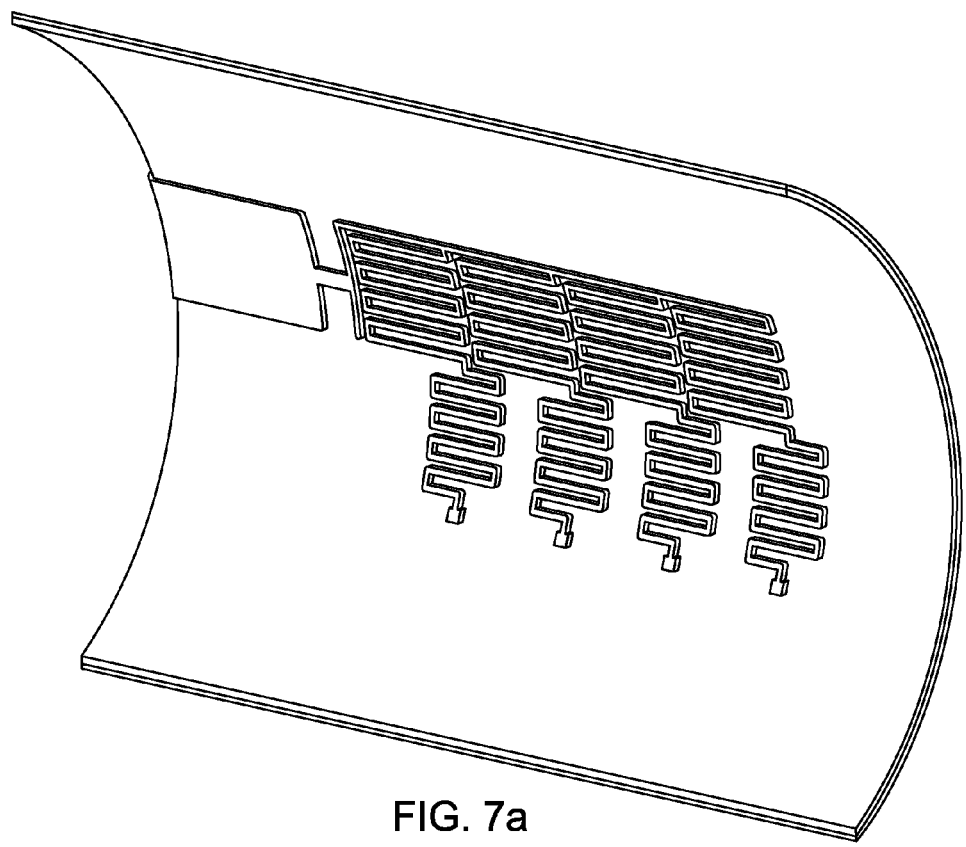
Figure 7B:
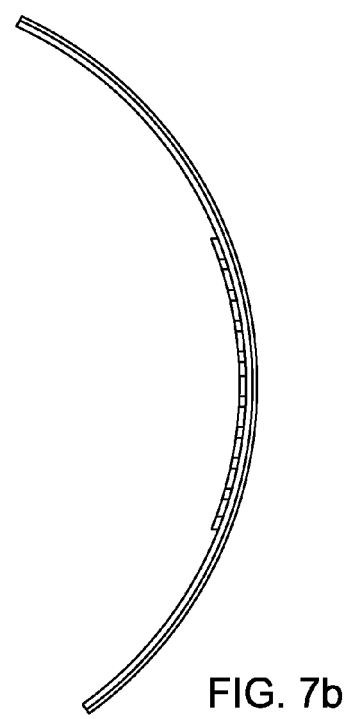

In one embodiment, dielectric substrate 310 can have a curved plane form-factor, as shown in FIGS. 7a (3D view) and 7b (side view). The gap between the two ends of the folded plane can be unfilled (air gap) or can be filled with a dielectric material. A skilled artisan would appreciate the fact that MTM antennas mounted on dielectric substrates having a more complex form factors (e.g., a 3D surface) are within the scope of this disclosure. A curved surface can advantageously provide additional tune to the antenna directivity. A more complicated 3D surface can be constructed by folding and wrapping on object having a desired shape, such as a cone.

Figure 8A:
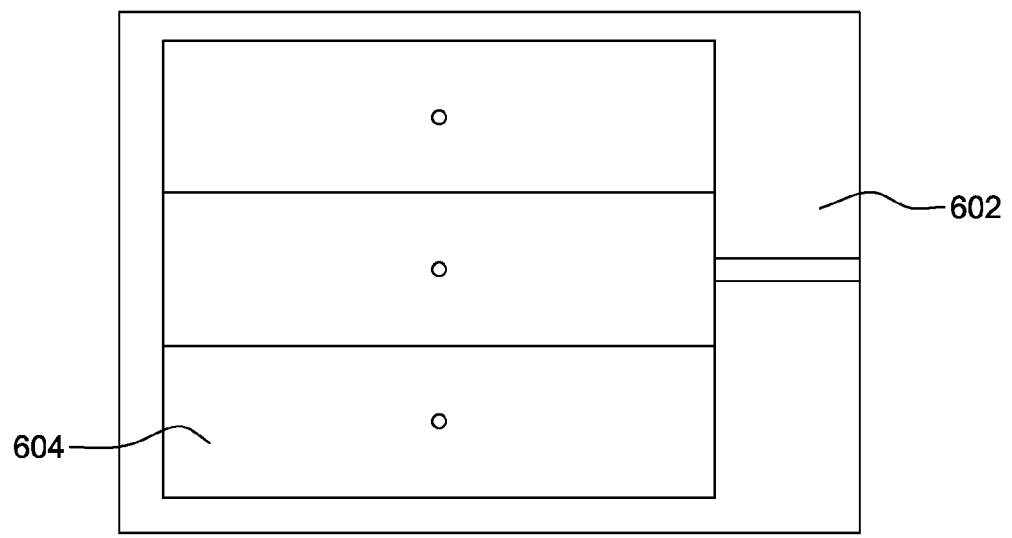
Figure 8B:
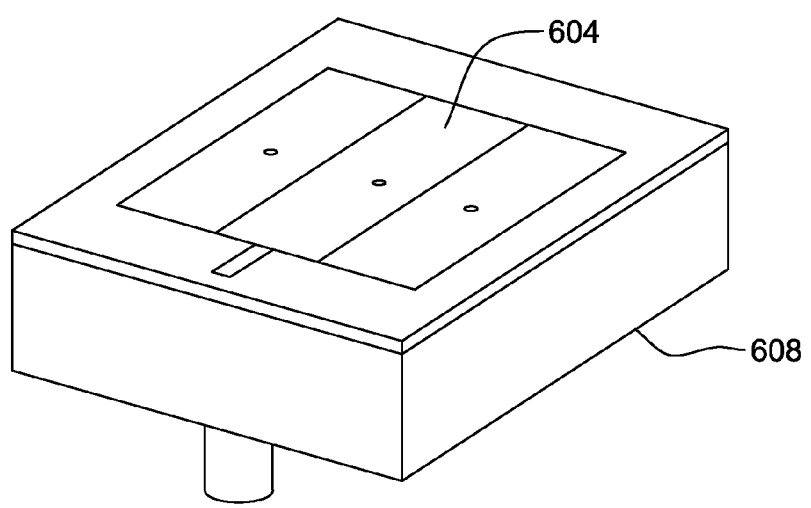

In one embodiment, antenna 155a-155z can be provided by a mushroom-shape MTM antenna shown in FIGS. 8a (top view) and 8b (3D view). In one embodiment, the gap between the feed line 602 and the top patch 604 can form a capacitor (left-hand); the via between the top patch 604 and the bottom ground 608 can form an inductance (left-hand).

In a further aspect, antenna 155a-155z can be broadband, ultrawideband (UWB), or multiband (MB). Antenna 155a-155z can be designed to support the desired functionality and characteristics. Antenna size, resonant frequencies, bandwidth, and matching properties can be controlled by changing the antenna design parameters including number and size of cells, the gap between the cells, the gap between the feed line and the cells, the size (radius and height) and location of vias, the length and width of the feed line, the length and width of the via line, the material and thickness of the substrate, and various other dimensions and layouts.

Antenna size and resonant frequency can be controlled by the patch shape and size. Cell patches can have a rectangular, triangular, circular or other shape. The most efficient antenna area usage can be provided by a rectangular shape. In a further aspect, the resonant frequency can be sensitive to the via line length. To control the via line length, a via line tuner can be provided having a straight line form, a curved line form, or an open polygon line form. The via line length can be used to adjust resonant frequency due to its left hand inductive character. In a further aspect, the resonant frequency can be sensitive to the feed line length and the size of the gap between a feed line and a cell patch. To control the feed line length, a feed line tuner can be provided having a straight line form, a curved line form, or an open polygon line form. The feed line length can be used to adjust resonant frequency due to its left hand capacitive character. In a further aspect, the resonant frequency can be sensitive to the thickness of the substrate on which the antenna components are disposed. The substrate thickness can range from 0.1 mm to 150 mm depending upon the substrate material. Various materials having different permittivity can be used, for example, but not limited to, FR4 ($\epsilon_r$=4.4), Getek ($\epsilon_r$=4.0), Polyimide ($\epsilon_r$=3.5), Polyester ($\epsilon_r$=3.9), Arlon AD250 ($\epsilon_r$=2.5), RT/duroid 5880 ($\epsilon_r$=2.2), etc.

In another aspect, an antenna can comprise a single cell or multiple cells. A multi-cell antenna can have a smaller resonant frequency shift as compared to a single cell antenna, but also can have a higher peak gain due to a better beam concentration.

In another aspect, the antenna return loss can be controlled by the radius of one or more vias that connect the cell patches and the ground plane: vias having smaller radius can provide a better return loss.

While the present invention has been particularly shown and described with reference to certain exemplary embodiments, it will be understood by one skilled in the art that various changes in detail may be affected therein without departing from the spirit and scope of the invention as defined by claims that can be supported by the written description and drawings. Further, where exemplary embodiments are described with reference to a certain number of elements it will be understood that the exemplary embodiments can be practiced utilizing less than the certain number of elements.

A small sample of systems methods and apparatus that are described herein is as follows:

A1. An encoded information reading (EIR) system comprising:
 a microprocessor communicatively coupled to a system bus;
 a memory communicatively coupled to said system bus;
 at least one RFID reading device communicatively coupled to said system bus;
 two or more external antennas, each antenna of said two or more antennas being electrically coupled to a multiplexing circuit via a coaxial cable;
 wherein said multiplexing circuit is configured to electrically couple each antenna of said two or more antennas to said RFID reading device by using one of: a time division method, a frequency division method;
 wherein said external antennas are disposed according to a spatial pattern configured to provide a spatially continuous RFID signal reception within one of: a pre-defined area, a pre-defined volume;
 wherein said two or more antennas are configured to receive RFID signals from a plurality of RFID tags disposed within a radio frequency range of said two or more antennas, said RFID tags being attached to a plurality of items; and
 wherein said EIR system is configured to store in said memory a plurality of responses received from said plurality of RFID tags.

A2. The EIR system of A1, wherein said multiplexing circuit is configured to electrically couple each antenna of said two or more antennas to said RFID reading device for a pre-defined period of time in a pre-defined sequential manner.

A3. The EIR system of A1, wherein said multiplexing circuit is configured to shift a frequency of a first signal received by an antenna of said two or more antennas before feeding said first signal into said RFID reading device; and
 wherein said multiplexing circuit is further configured to shift a frequency of a second signal to be transmitted by an antenna before feeding said second signal to said antenna by said RFID reading device.

A4. The EIR system of A1, wherein said multiplexing circuit comprises one or more hardware components.

A5. The EIR system of A1, wherein said multiplexing circuit comprises one or more software components.

A6. The EIR system of A1, wherein said plurality of responses received from said plurality of RFID tags include one of: a product code, an EPC code, an RFID tag identifier, and an alphanumeric string.

A7. The EIR system of A1, wherein said two or more external antennas are mounted on one or more storage shelves.

A8. The EIR system of A1, wherein said two or more external antennas are mounted on a vending machine.

A9. The EIR system of A1, further configured to transmit to an external computer at least one message based on said plurality of responses received from said plurality of RFID tags.

A10. The EIR system of A1, further comprising a software module for processing data received from said plurality of RFID tags.

A11. The EIR system of A1, wherein at least one antenna of said two or more external antennas is fabricated of a material having a composite right- and left-handed (CRLH) structure.

A12. The EIR system of A1, wherein at least one antenna of said two or more external antennas is mounted on a printed circuit board (PCB).

A13. The EIR system of A1, wherein at least one antenna of said two or more external antennas is provided by at least one of: a patch cell array comprising one or more patch cells, a patch cell stack comprising two or more patch cells.

The invention claimed is:
1. A radio frequency identification ("RFID") system comprising:
 two or more antennas of an RFID reader, each of the two or more antennas:
  being spaced apart at a distance that exceeds the two or more antennas' effective radio frequency (RF) reception range of each antenna of the two or more antennas respectively, so that the two or more antennas can transmit and receive two or more RF signals simultaneously; and
  being electrically coupled to a multiplexing circuit that multiplexes signals transmitted to or received from the two or more antennas using frequency division multiplexing so each of the two or more antennas are capable of transmitting and receiving the two or more RF signals at different frequencies, so that the two or more RF signals can be distinguished within the RFID system;
 wherein the two or more RF signals to be transmitted to or received by each respective antenna of the two or more antennas are frequency-shifted up or down by the multiplexing circuit so that the two or more antennas communicate with respective RFID tags at different non-overlapping frequency ranges assigned by the multiplexing circuit, wherein at least one of the two or more antennas comprises cells that are disposed on a substrate according to a spatial pattern to provide a spatially continuous RFID signal reception with respective RF signals of the two or more RF signals, and wherein the two or more antennas are configured to receive RFID signals of the two or more RF signal received from a plurality of RFID tags disposed within a radio frequency range of the two or more antennas respectively.

2. The RFID system of claim 1, wherein said multiplexing circuit is configured to shift a frequency of a first signal received by an antenna of said two or more antennas before feeding said first signal into the RFID reader; and wherein said multiplexing circuit is further configured to shift a frequency of a second signal to be transmitted by an antenna before feeding said second signal to said antenna by said RFID reader.

3. The RFID system of claim 1, wherein said multiplexing circuit comprises one or more hardware components.

4. The RFID system of claim 1, wherein said multiplexing circuit comprises one or more software components.

5. The RFID system of claim 1, wherein a plurality of responses received from said plurality of RFID tags include one of: a product code, an EPC code, an RFID tag identifier, and an alphanumeric string.

6. The RFID system of claim 1, wherein said two or more antennas are mounted on one or more storage shelves.

7. The RFID system of claim 1, wherein said two or more antennas are mounted on a vending machine.

8. The RFID system of claim 1, further configured to transmit to an external computer at least one message based on a plurality of responses received from said plurality of RFID tags.

9. The RFID system of claim 1, further comprising a software module for processing data received from said plurality of RFID tags.

10. The RFID system of claim 1, wherein at least one antenna of said two or more antennas is fabricated of a material having a composite right- and left-handed (CRLH) structure.

11. The RFID system of claim 1, wherein at least one antenna of said two or more antennas is mounted on a printed circuit board (PCB).

12. The RFID system of claim 1, wherein at least one antenna of said two or more antennas is provided by at least one of: a patch cell array comprising one or more patch cells, a patch cell stack comprising two or more patch cells.

13. The RFID system of claim 1, further comprising the RFID reader coupled to the multiplexing circuit.

14. The RFID system of claim 1, further comprising memory, wherein the RFID system is configured to store in the memory a plurality of responses received from the plurality of RFID tags.

15. The RFID system of claim 1, wherein the two or more antennas are external antennas.

16. The RFID system of claim 1, further comprising a microprocessor and memory, wherein the RFID reader, memory, and microprocessor are each coupled to a system bus, and wherein the RFID reader is coupled to the multiplexing circuit.

* * * * *